(12) United States Patent
Wang et al.

(10) Patent No.: US 11,488,635 B2
(45) Date of Patent: Nov. 1, 2022

(54) METHOD, ELECTRONIC DEVICE AND STORAGE MEDIUM FOR GENERATING A VIDEO

(71) Applicant: Beijing Dajia Internet Information Technology Co., Ltd., Beijing (CN)

(72) Inventors: Qian Wang, Beijing (CN); Paliwan Pahaerding, Beijing (CN); Ying Shu, Beijing (CN); Chang Sun, Beijing (CN)

(73) Assignee: Beijing Dajia Internet Information Technology Co., Ltd., Beijing (CN)

( * ) Notice: Subject to any disclaimer, the term of this patent is extended or adjusted under 35 U.S.C. 154(b) by 0 days.

(21) Appl. No.: 17/028,816

(22) Filed: Sep. 22, 2020

(65) Prior Publication Data

US 2021/0005223 A1  Jan. 7, 2021

(30) Foreign Application Priority Data

Sep. 23, 2019 (CN) .......................... 201910900265.X

(51) Int. Cl.
*G11B 27/031* (2006.01)
*G06F 3/0482* (2013.01)

(52) U.S. Cl.
CPC .......... *G11B 27/031* (2013.01); *G06F 3/0482* (2013.01)

(58) Field of Classification Search
CPC ..... G11B 27/031; G11B 27/34; G06F 3/0482; H04N 21/47205; H04N 21/4782; H04N 21/4668; H04N 21/4312
USPC ....................................................... 386/282
See application file for complete search history.

(56) References Cited

U.S. PATENT DOCUMENTS

| | | | |
|---|---|---|---|
| 9,602,881 B1* | 3/2017 | Greene | H04N 21/458 |
| 2013/0127990 A1* | 5/2013 | Lin | H04N 13/139 |
| | | | 348/43 |
| 2013/0272679 A1* | 10/2013 | Cavalcanti | G11B 27/034 |
| | | | 386/282 |

(Continued)

FOREIGN PATENT DOCUMENTS

| | | |
|---|---|---|
| CN | 101340464 A | 1/2009 |
| CN | 101390032 A | 3/2009 |

(Continued)

OTHER PUBLICATIONS

"How does Kuaishou shoot the same video? A guide to how to shoot the same music video quickly!" Nov. 14, 2018 www.mumayi.com/jiaocheng-20181112-126324.html.

(Continued)

*Primary Examiner* — Loi H Tran
(74) *Attorney, Agent, or Firm* — Knobbe, Martens, Olson & Bear, LLP

(57) ABSTRACT

Disclosed are a method an electronic device and a computer storage medium for generating a video. The method includes: receiving a video generating instruction, wherein the video generating instruction is generated in response to a user operation on a video generating link on a video playback page; obtaining video templates based on the video generating instruction, where the video templates comprises a first video template, and the first video template is a template adopted by a current video shown on the video playback page; determining a target template based on the video template; and generating the video based on the target template.

17 Claims, 9 Drawing Sheets

(56) References Cited

U.S. PATENT DOCUMENTS

| | | | | |
|---|---|---|---|---|
| 2014/0337881 A1* | 11/2014 | Huang | ............... | H04N 21/2223 |
| | | | | 725/34 |
| 2018/0063602 A1* | 3/2018 | Kalish | .................. | H04N 21/854 |
| 2019/0252000 A1* | 8/2019 | Orgill | ................... | G11B 27/031 |
| 2020/0170485 A1* | 6/2020 | Takahashi | ................ | H04N 7/18 |
| 2020/0410034 A1* | 12/2020 | Huang | ........... | H04N 21/234336 |
| 2021/0312948 A1* | 10/2021 | Haley | ................ | H04N 21/4307 |

FOREIGN PATENT DOCUMENTS

| | | |
|---|---|---|
| CN | 103617034 A | 3/2014 |
| CN | 105635129 A | 6/2016 |
| CN | 107729522 A | 2/2018 |
| CN | 108668164 A | 10/2018 |
| CN | 108900768 A | 11/2018 |
| WO | WO 2017/014800 A1 | 1/2017 |

OTHER PUBLICATIONS

How to shoot the same special effects for Kuaishou, and how to use the same props for Kuaishou, Nov. 12, 2018 https://jingyan.baidu.com/article/d7130635ee149a131dl4758e.html.

"How to use the same props for Tiktok, and how to use the same special effects for Tiktok," Sep. 5, 2018 https://jingyan.baidu.com/article/2954301181404b0c7e005011.html.

"How to view the same special effects in Tiktok, a list of steps to use the same special effects in Tiktok," Sep. 4, 2019 https://www.duote.com/tech/douyin/120885.html.

* cited by examiner

METHOD, ELECTRONIC DEVICE AND STORAGE MEDIUM FOR GENERATING A VIDEO

CROSS REFERENCE TO RELATED APPLICATION

This application is based on and claims priority under 35 U.S.C 119 to Chinese Patent Application No. 201910900265.X, fled on Sep. 23, 2019, in the China National Intellectual Property Administration. The entire disclosure of the above application is incorporated herein by reference.

FIELD

The disclosure relates to the field of video processing technology, and in particular, relates to a method, an electronic device and a computer storage medium for generating a video.

BACKGROUND

With the rapid development of the Internet technology, some short video platforms with high traffic content have gradually emerged in the video industry, bringing the richer entertainment experience to people.

At present, the platforms that provide the content also allow users to create their own content, thus the users are both the viewers and creators of the network content. However, these existing platforms are still unable to allow the user to balance the role playing between a viewer and a creator of the network content well. Therefore, how to achieve the balance between them has become a problem to be solved.

SUMMARY

The disclosure provides a method, an electronic device and a storage medium for generating a video.

In a first aspect, an embodiment of the disclosure provides a method for generating a video. The method includes receiving a video generating instruction, where the video generating instruction is generated in response to a user operation on a video generating link on a video playback page; obtaining video templates based on the video generating instruction, where the video templates comprises a first video template, and the first video template is a template adopted by a current video shown on the video playback page; determining a target template based on the video template; and generating the video based on the target template.

In a second aspect, an embodiment of the disclosure provides an electronic device, including a processor, and a memory configured to store instructions that can be executed by the processor. The processor is configured to execute the instructions to perform: receiving a video generating instruction, where the video generating instruction is generated in response to a user operation on a video generating link on a video playback page; obtaining video templates based on the video generating instruction, where the video templates comprises a first video template, and the first video template is a template adopted by a current video shown on the video playback page; determining a target template based on the video template; and generating the video based on the target template.

In a third aspect, an embodiment of the disclosure provides a computer storage medium storing the computer executable instructions configured to perform: receiving a video generating instruction, where the video generating instruction is generated in response to a user operation on a video generating link on a video playback page; obtaining video templates based on the video generating instruction, where the video templates comprises a first video template, and the first video template is a template adopted by a current video shown on the video playback page; determining a target template based on the video template; and generating the video based on the target template.

BRIEF DESCRIPTION OF THE DRAWINGS

In order to illustrate the technical solutions in the embodiments of the disclosure more clearly, the accompanying figures which need to be used in the embodiments of the disclosure will be introduced below briefly Obviously the accompanying figures introduced below are only some embodiments of the disclosure, and other accompanying figures can also be obtained by those ordinary skilled in the art according to these accompanying figures without creative labor.

DETAILED DESCRIPTION OF THE EMBODIMENTS

As mentioned above, with the rapid development of the Internet technology, some short video platforms with high traffic content have gradually emerged in the video industry, bringing the richer entertainment experience to people. Here, the users are both the viewers and creators of the network content. How to balance the role playing between the viewer and creator of the network content for the user has become a problem to be solved.

In some embodiments, the disclosure provides a method, an electronic device and a computer storage medium for generating a video. Through providing a video generating entry (e.g., a video generating link) on the content detail page (e.g., video playback page), the user can quickly enter the edit page and produce his/her own work when he or she has an intention to do such during the content browsing. In some embodiments, the edit page may be the template editing page of the video template adopted by a current video shown on the video playback page, so that the user may quickly generate a video on the template editing page.

In some embodiments, it is also possible to make the personalized template recommendations for the user, to meet the user's various creating ideas. As such, more creations can be made conveniently based on the user's own needs and preferences, thereby increasing the conversion rate for content creation.

Figure 1:
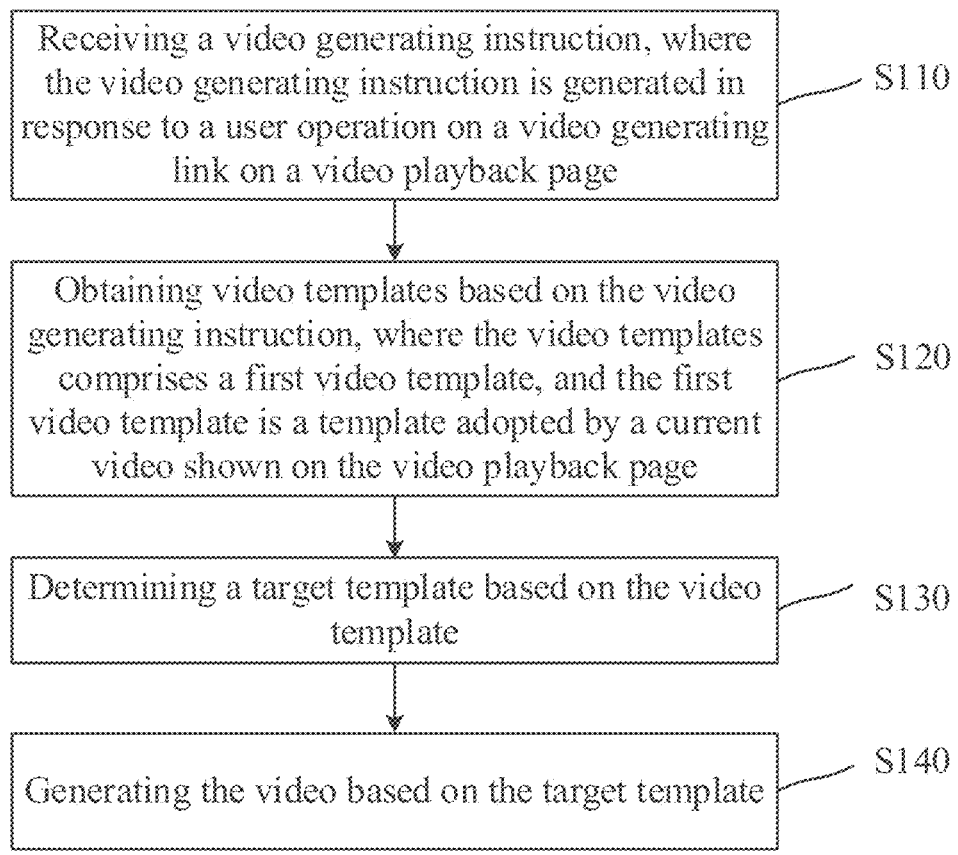
FIG. 1 is a schematic flowchart of a method for generating a video according to an embodiment of the disclosure.

FIG. 1 is a schematic flowchart of generating a video according to an embodiment of the disclosure. In some embodiments, the method may be implemented by a client, i.e., a user terminal device (for example, an electronic device or a computing device). In some embodiments, it may be implemented by mutual coordination between the user and the user terminal device or between the user terminal device and the server. For example, the user terminal may obtain the information or content (e.g., the video templates, template list, video examples and the like described below) required for interface display or processing from the server, and perform the video processing or interface display based on the obtained information or content, which will not be repeated here.

In one embodiment, a predetermined application client may be installed and ninon the user terminal device, and the user may, for example, create the content based on the method for generating a video through the interaction with the user interface of the application client.

The disclosure may illustrate details by taking a video as an example of network content. Those skilled in the art should understand that the method described in the disclosure may also be applicable to other types of network content, which is not limited in the disclosure.

In S110: receiving a video generating instruction, where the video generating instruction is generated in response to a user operation on a video generating link on a video playback page.

Figure 2:
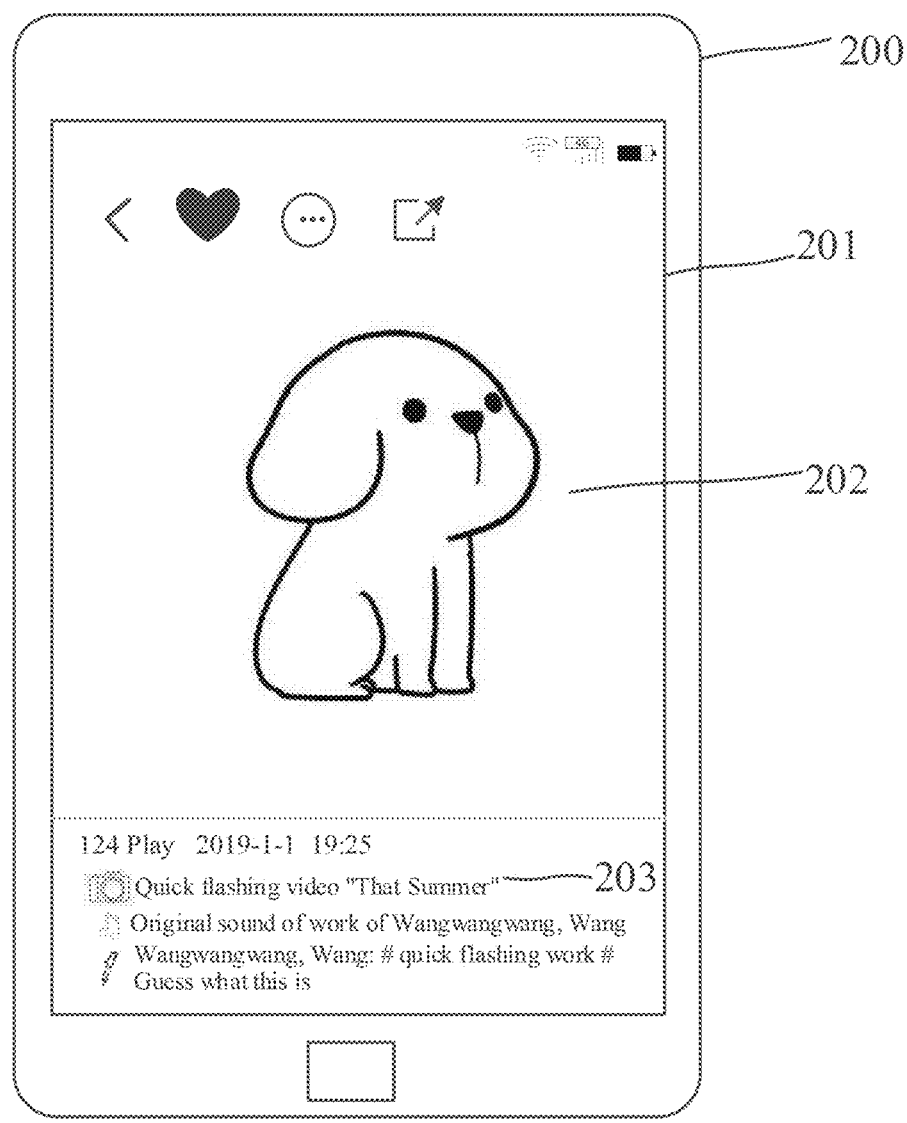
FIG. 2 is a schematic diagram of a video playback page according to an embodiment of the disclosure.

In some embodiments, FIG. 2 is a schematic diagram of a video playback page. As shown in FIG. 2, a video playback page 201 is presented on an electronic device 200. In some embodiments, the video playback page 201 may show the video generating link 203 and other information related to the video below the video playing box with playing the video content 200. The user may trigger the subsequent video generating operations through the user's operation (for example, click, touch, etc.) on the video generating link 203. It should be understood that this is only for the sake of illustration, and only one frame of played picture is shown statically, but there is no limitation on video.

In S120, obtaining video templates based on the video generating instruction, where the video templates includes a first video template, wherein the first video template is a template adopted by a current video shown on the video playback page.

In some embodiments, a template adopted by the current video shown on the video playback page can be referred to as the first template. Accordingly, the first template can be obtained in response to that the video generating instruction is received.

In S130, determining a target template based on the video template.

Figure 3:
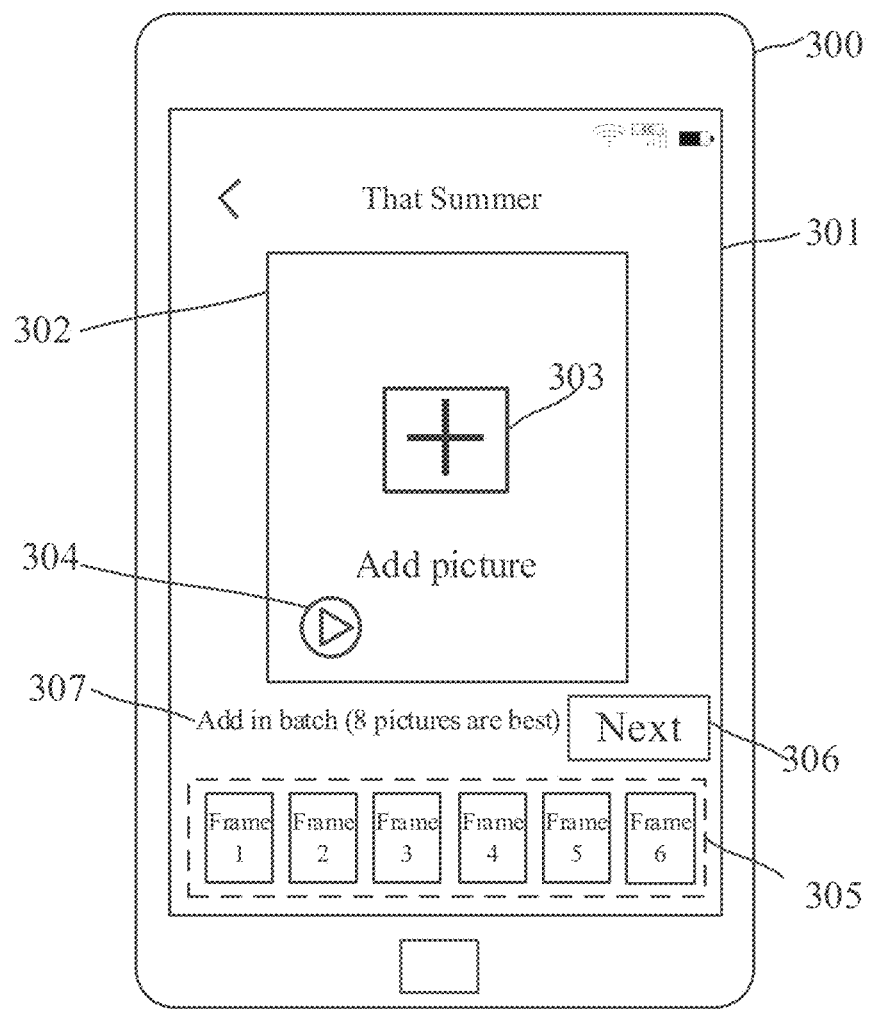
FIG. 3 is a schematic diagram of a page showing a video template according to an embodiment of the disclosure.

In some embodiments, the first video template may be or may not be determined as the target template. In response to that the first video template is determined as the target template, the first video template is displayed for possible editing. In some embodiments, FIG. 3 is a schematic diagram of a page showing a video template. As shown in FIG. 3, the template page 301 is displayed on the electronic device 300. The first template 302, serving as the target template, is shown on the template page (also can be referred to as template editing page or content editing page), to allow the user to edit the template. In some embodiments, the video template presented in the embodiment of the disclosure may be, for example, one of key frames of the video template.

In S140, generating the video based on the target template.

In some embodiments, the user can interact with the template page including the target template. As shown in FIG. 3, for example, the various options on the template page 301 displayed on the electronic device 300 can be clicked by the user, accordingly, the client can generate a video by performing the corresponding operations.

In some embodiments, the interaction between the user and the template page may include selecting the user material by clicking on the add picture option 303, previewing the first exemplary video corresponding to the first video template by clicking on the preview option 304, previewing the key frame in the first template by clicking on or sliding toward left/right in the key frame preview area 305 (e.g., Frame 1, Frame 2, Frame 3, Frame 4, Frame 5, Frame 6, etc. shown in the dotted box 305 of FIG. 3), entering the page corresponding to the next step (for example, the preview page of the generated video, or the next editing page) by the clicking the next option 306, and performing batch processing by clicking on the description information box 307 (for example, "Add in batch (8 pictures are best)"), and so on.

According to some embodiments of the disclosure, the user can conveniently enter the template page through the video generating entry to produce his/her own work when he/she is watching a video.

In the embodiments of the disclosure, it is also possible to make the personalized template recommendations for the user, to meet the user's various creating ideas. As such, more creations can be made conveniently based on the user's own needs and preferences, thereby increasing the conversion rate for content creation.

In some embodiments, the video templates obtained further includes a second template, where the second template includes one of the following a template corresponding to a video with a click rate ranking in a top preset rank; a template similar to the first template and a template determined based on user preferences.

Accordingly, the target template is determined based on the first template and the second template in response to a user's selecting instruction.

Figure 4:
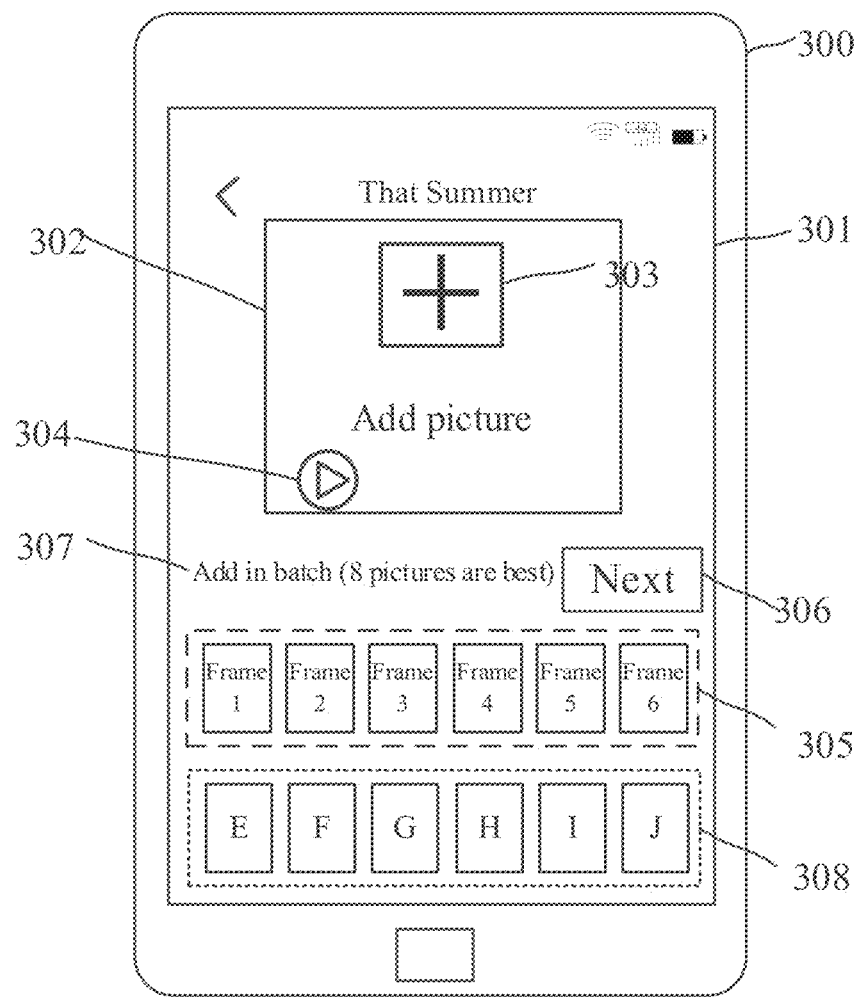
FIG. 4 is a schematic diagram of an exemplary page according to an embodiment of the disclosure.

It should be noted that, the implementation of obtaining the first template and obtaining the second video template is not limited in the disclosure. In some embodiments, the first/second video template may be obtained from the server. In another embodiments, the first/second video template may be obtained from the local cache of the terminal. Further the obtaining sequence is not limited either, in some embodiments, the first and second video templates can be obtained at the same time, or firstly the first template is obtained and then the second video template is obtained, or firstly the second video template is obtained and then the first template is obtained. Moreover, the first and second video templates may be presented at the same time, which is not limited either. As an example, the exemplary page that presents the first template and the second video template at the same time may be, for example, as shown in FIG. 4. Compared with FIG. 3, FIG. 4 has the area 308 of the second video template at the bottom of the template page shown in FIG. 3 (or is presented after the template page is slided down), where the area 308 may include at least one second video template E, F, G, H, I, J . . . that is recommended. The user can select the target video template on the template page. If the user selects the first template as the target video template, the reference may be made to the related description above in combination with FIG. 3, which will not be repeated here.

The user can also select the second video template as the target video template based on the area 308. Referring to FIG. 4, the user can slide left and right to browse the second video templates. In some embodiments, when the user clicks on one of the at least one second video template E, F, G, H, I, J . . . (for example, the second video template F), the first template presented on the template page may be replaced with the second video template F, so that the user can use the second video template F as the target video template and produce a video. The creation implementation details of generating the video based on the second video template F are the same as the operations of the video creation for the first template in combination with FIG. 3 above, and the difference may be that the templates are different. For details, the reference may be made to the related description above, which will not be repeated here.

It should be understood that the "first" and "second" in the full description of the disclosure are only used to distinguish the described objects, rather than to limit their functions or order.

In some embodiments, before presenting the above video templates, the electronic device/client may interact with the server so as to obtain the video templates (including the first template and the second video template) from the server.

In some embodiments, in response to that detecting the operation of the user on the video generating link on the video playback page, the first template used by the video may be downloaded from the server, and then the first template is presented. As such, excessive use of local storage due to pre-caching the first template is avoided. Of course, based on the actual service demands, it is also possible to download the first template from the server and cache it locally when the user is watching the video on the video playback page, so that the first template can be obtained and presented from the local cache in time when the user generates the video creation intention, thereby reducing the waiting time of the user.

In some embodiments, the at least one second video template to be recommended and presented is obtained from the server when the first template is presented. In another embodiments, after the user selects a certain second video template, the second video template is obtained from the server and presented. Of course, the second video template may also be cached in advance, that is, the timing of obtaining the second video template is not limited in the disclosure.

In some embodiments, the obtaining mechanism of the first/second video template may be adaptively determined according to the current scene of the user, for example, depending on the current network status. For example, the video template is cached in advance when the network status is poor, and the video template is obtained from the server in real time in response to the user operation when the network status is good, which is not limited in the embodiments of the disclosure, and will not be repeated here. That is, a suitable mechanism of obtaining the video template is adaptively configured, to avoid the network delays and other situations, reduce the user waiting time, and thus improve the user experience.

In some embodiments, in a case that the terminal locally caches the first template and/or the second video template, in response to that the video playback page or the template page is closed, the previously cached first template and/or second video template may be removed from the cache in order to release the cache in time.

In some embodiments, before presenting the above video templates (including the aforementioned first template and second video template) or even before obtaining the aforementioned video templates, the terminal side may further firstly determine whether the first video template desired to be obtained meet a preset condition, and display the first video template in response to determining that it meet the preset condition. When the preset condition is not met, other recommended video templates are obtained, and the abnormal information is displayed.

In some embodiments, the terminal/client may obtain a template list from the server, wherein the template list may include template identifiers (IDs) of video templates, labels indicating whether the video templates are offline, and terminal models and systems for video templates. Based on the template list, the terminal client can determine whether the video template desired to be obtained, e.g., the first video template, meet the above preset condition.

In some embodiments, the preset condition may include: for example, the template list comprises the template identifier of the first video template, the template list comprises a label that the first video template is not offline, the template list comprises terminal models and systems which the first video template is adopted to.

Based on that the video templates meet the above preset conditions, the video template may be obtained from the server, and then the obtained video template may be presented. If any one of the above preset conditions is not met, it means that the currently requested video template is not available (for example, the template is not available because the template is offline, the template is not adapted to the terminal model or system, etc.). At this time, an exemplary page including at least one second video template recommended may be presented subsequently, and the abnormal information may also be presented.

Figure 5:
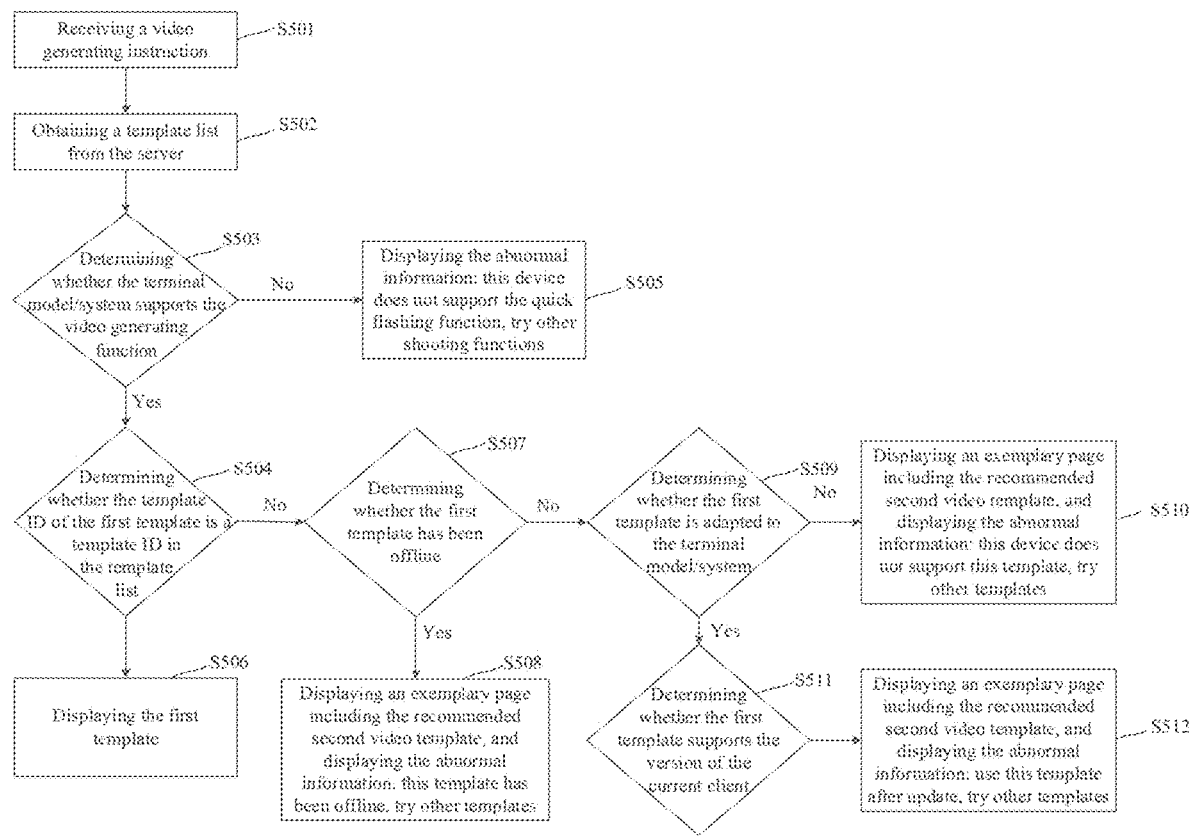
FIG. 5 is a schematic flow chart of an abnormality judgment process according to an embodiment of the disclosure.

FIG. 5 is a schematic diagram of an abnormality judgment process according to an embodiment of the disclosure. The process is illustrated by taking the abnormal judgment before presenting the video template as an example. It should be understood that the abnormal judgment may also be performed, for example, before obtaining the video template in some embodiments, which is not limited in the disclosure.

As shown in FIG. 5, the process applied to the client includes the following operations.

In S501, receiving a video generating instruction.

In S502, obtaining a template list from the server based on the video generating instruction, where the template list may include the template identifiers of video templates, labels indicating whether video templates are offline, and terminal models and systems for video templates.

In S503, determining, based on the obtained template list, whether the terminal model/system supports the video generating function (for example, quick flashing function). In response to determining that the terminal model/system supports the video generating function, proceeding to S504.

In response to determining that the terminal model/system does not support the video generating function, proceeding to S505.

In S505, displaying the abnormal information to prompt the user that the current terminal does not support the video generating function, and advise the user to try other shooting functions. In some embodiments, the abnormal information may be, for example, floated on the relevant page on which the video generating instruction can be triggered, which is not limited in the disclosure.

In S504, determining whether the template ID of the first template is a template ID in the template list. In response to that the template ID of the first template is a template ID in the template list, proceeding to S506, in response to that the template II) of the first template is not a template ID in the template list, proceeding to S507.

In S506, displaying the first template.

In S507, determining whether the first template has been offline. In response to that the first template has been offline, proceeding to S508: in response to that the first template has not been offline, proceeding to S509.

In S508, displaying an exemplary page (also called template selection page) including the recommended second video templates and the abnormal information. The abnormal information may be presented on the exemplary page to prompt the user to select other templates for video creation. In some embodiments, in the case that at least one second video template is displayed on the exemplary page, the second video template displayed on top may be positioned and the abnormal information may be presented at this position.

In S509, determining whether the first template is adapted to the terminal model/system of the terminal presenting the video playback page, that is, whether the first template supports the terminal model/system of the terminal. In response to that the first template supports the model/system of the current terminal, proceeding to S511; in response to that the first template does not support the model/system of the current terminal, proceeding to S510.

S510 is similar to S508, where an exemplary page (also called template selection page) including the recommended second video template may be presented to the user, and the abnormal information may be presented on the exemplary page to prompt the user to select other templates for video creation. In some embodiments, in the case that at least one second video template is displayed on the exemplary page, the second video template displayed on top may be positioned and the abnormal information may be presented at this position.

In S511, determining whether the first template supports the version of the client currently presenting the video playback page, and in response to that the first template does not support the version of the client, proceeding to S512.

S512 is similar to S508 and S510, where an exemplary page (also called template selection page) including the recommended second video template may be presented to the user, and the abnormal information may be presented on the exemplary page to prompt the user to select other templates for video creation. In some embodiments, in the case that at least one second video template is displayed on the exemplary page, the second video template displayed on top may be positioned and the abnormal information may be presented at this position.

It should be understood that the foregoing implementation process may also be applicable to other video templates desired to be obtained (for example, the recommended second video template), which is not limited in the embodiments of the disclosure.

Based on the judgement process, the state of the video template desired to be obtained, i.e., whether the template is available, may be determined in advance.

In some embodiments, the developer of the video templates may also provide a corresponding exemplary video for each video template (the exemplary video may also be created and shared by other users, which is not limited in the disclosure). In response to that the operation of a user on the video generating link on the video playback page is detected, for example, an exemplary page including the exemplary video may be presented at first. After the user browses the exemplary video and still has the video creation intention, he may click on the video production option associated with the exemplary video on the exemplary page. As such, the user can create a video based on the video template corresponding to the exemplary video.

In some embodiments, the method further includes: displaying an exemplary page of the first video template, where the exemplary page includes a first exemplary video and a first video production option, and where the first exemplary video corresponds to the first video template, and the first video production option corresponds to the first exemplary video; and displaying an edit page of the first video template in response to that the first video production option is selected.

Figure 6:
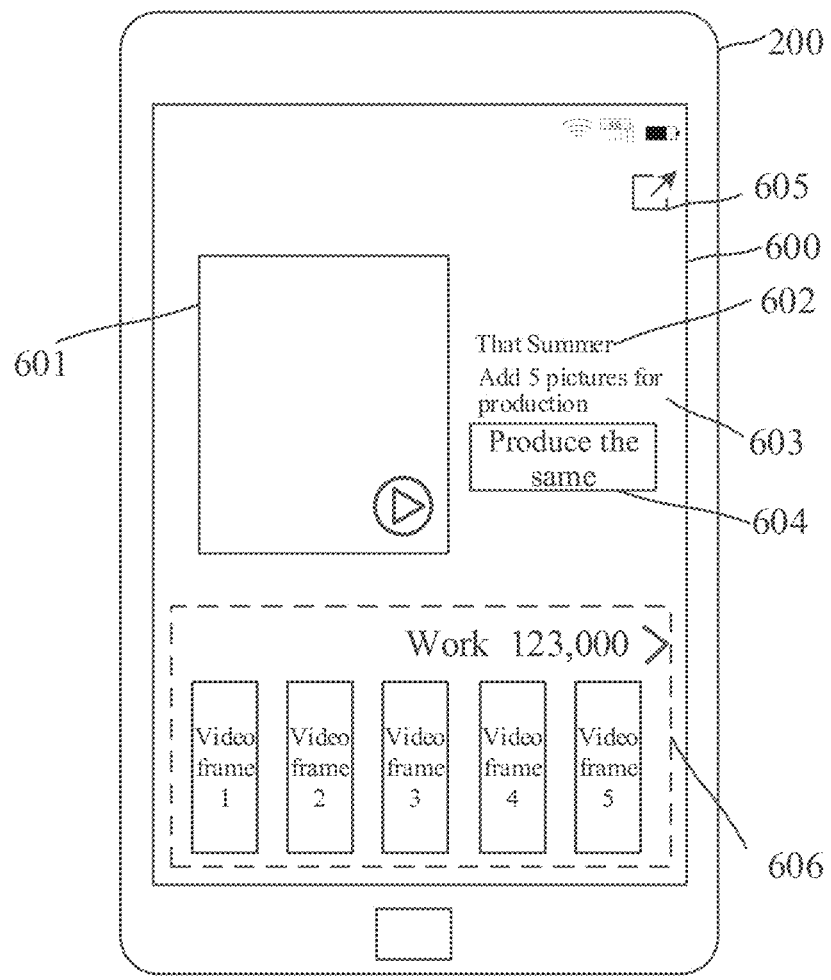
FIG. 6 is a schematic diagram of an exemplary page according to an embodiment of the disclosure.

The exemplary page of the first template may be as shown in FIG. 6, where an exemplary page 600 is displayed on the electronic device 200. The exemplary page 600 may, for example, include but not limited to a video example display area 601, a video template name 602 (e.g., "That Summer"), the description information about using the video template 603 (e.g., "Add 5 pictures for production"), a video production option 604 (e.g., "Produce the same"), a share option 605, a work show area 606, and so on.

In some embodiments, based on the video example display area 601, the user can browse the exemplary video. After the user clicks on the video production option 604, the template page as shown in FIG. 3 can be presented, and a video can be generated based on the video template which is determined as the target video template. In some embodiments, the work show area 606 may show the quantity (e.g., 123,000) of videos created based on the first template and include a certain video frame corresponding to a video (which may be recommended based on the number of clicks of the video, for example) created by another user based on the first template. In some embodiments, the user can also share the current video template to friends or other platforms through the share option 605. In some embodiments, the user can select the video frame in the work show area 606 by sliding right or left on the video example display area 601 on the current page.

Through providing the exemplary page as illustrated above, the user's enthusiasm for video creation is further stimulated. In addition, a variety of functional options are further provided on the exemplary page, to provide users with more functional experience, and at the same time expand the show approaches of video templates and show more possibilities for video creation.

In some embodiments, the exemplary page of the first template may also serve as the exemplary page of the second video template. Not only the first exemplary video and the corresponding first video production option but also the second exemplary video corresponding to at least one second video template can be presented on this exemplary page.

Correspondingly, each exemplary second video is associated with a corresponding second video production option.

Through providing the exemplary page including the first exemplary video and the second exemplary video, the chances of creating a video is increased.

In some embodiments, the second video templates may, for example, include at least one of: a template corresponding to a video with a click rate ranking in a top preset rank, a template similar to the first template, and a template determined based on user preferences.

In some embodiments, the second video template may be recommended as personalized. For example, the deep learning technology can be used to construct a user behavior model and generate a personalized recommendation list based on the user behaviors. In some embodiments, for example, the user behavior data (such as using, clicking, browsing the template data of work, etc.) authorized by the user and the template data (such as work volume, the number of authors, type, popularity, etc.) indexes can be used, and the weight of each index is allocated through the deep learning to construct a personalized recommendation model, and the recommendation is made to the user based on the personalized recommendation model.

Based on the personalized recommendation, the video templates that may be more easily adopted by the user is recommended to the user.

Figure 7:
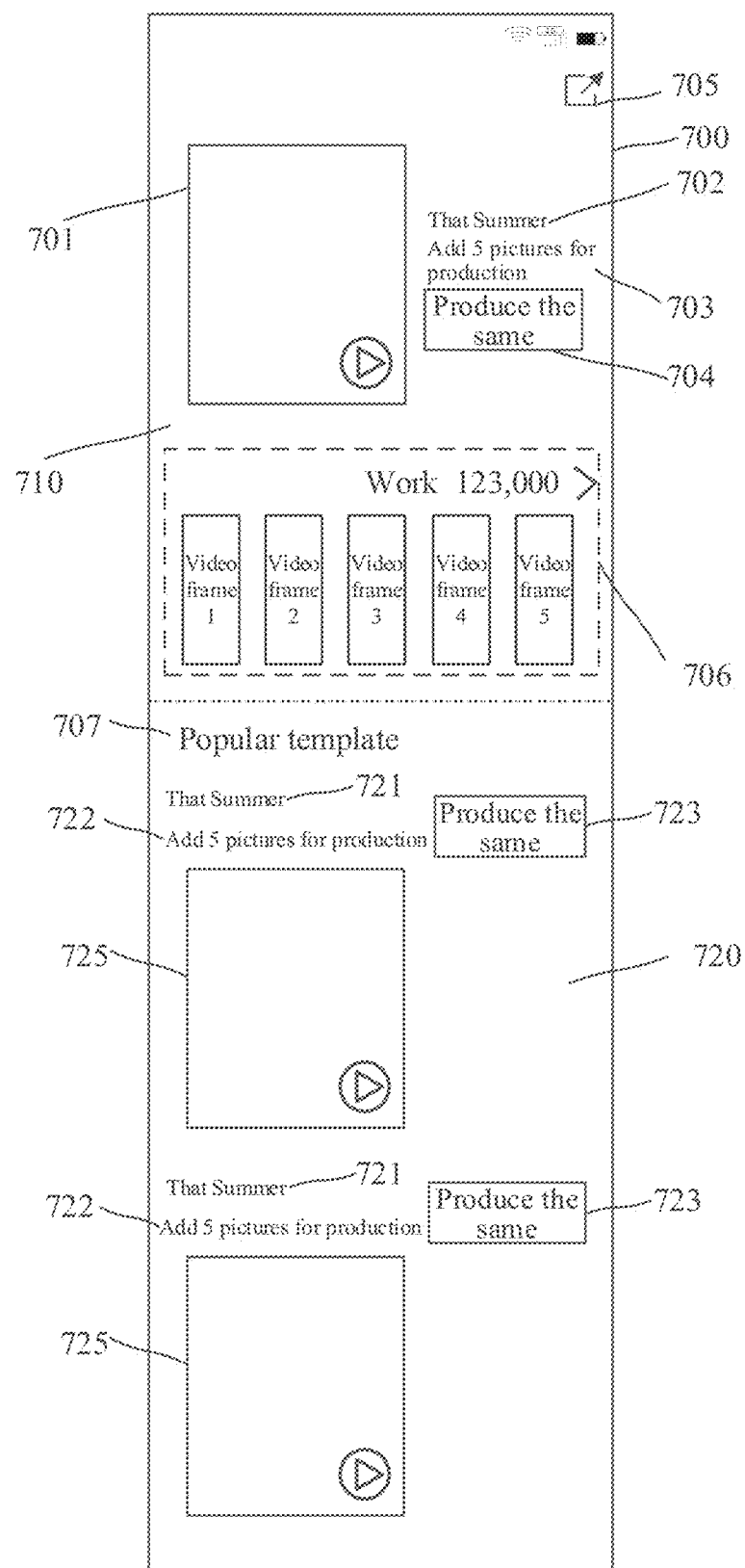
FIG. 7 is a schematic diagram of an exemplary page according to an embodiment of the disclosure.

In some embodiments, the exemplary page including the first template and the second video template may be as shown in FIG. 7. The exemplary page 700 may, for example, include a first area 710 and a second area 720, which are separated by a dotted line in FIG. 7. The part above the dotted line is regarded as the first area 710 and the part below the dotted line is regarded as the second area 720.

In some embodiments, the first area 710 may show the related content corresponding to the first exemplary video as same as the page structure of the page shown in FIG. 6.

In some embodiments, the second area 720 may present at least one second exemplary video 725 based on the second video template, as well as the template name 721 associated with the second exemplary video, the description information about using the video template 722 (e.g., "add 5 pictures for production"), a video production option 723 (e.g., "produce the same"), and so on, where the shown second exemplary video may be generated based on the recommended second video template. In an embodiment of the disclosure, the video template corresponding to the second area 720 can also be an area showing a popular template (labeled as 707 as shown in FIG. 7). It should be understood that, in some embodiments, each video template have an unique template ID, and different video templates may have the same template name. The names of the video templates corresponding to the second exemplary video recommended in the first area 720 may be the same or different, which is not limited in the disclosure.

Figure 8A:
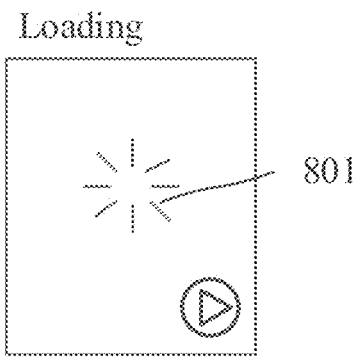
FIG. 8A is a schematic diagram of a video example in a first state according to an embodiment of the disclosure.
Figure 8B:
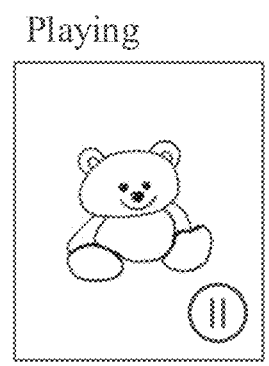
FIG. 8B is a schematic diagram of a video example in a second state according to an embodiment of the disclosure.
Figure 8C:
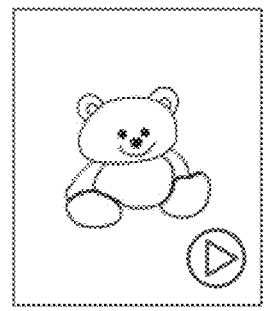
FIG. 8C is a schematic diagram of a video example in a third state according to an embodiment of the disclosure.

In response to that the exemplary page 700 as shown in FIG. 7 is entered, the first exemplary video can be automatically played. In some embodiments, before the video is automatically played, the first exemplary video in the loading state as shown in FIG. 8A may be displayed in the video example display area 701. In the loading state, the loading identifier (circle 801 as shown in FIG. 8A) is displayed by way of floating in the video example display area 701. During the play of the video after the loading finished, the video example display area 701 presents the first exemplary video in the playing state as shown in FIG. 8B. In response to that the user clicks on the pause option 805 presented in the video example display area 701 shown in FIG. 8B, the video example display area 701 presents the first exemplary video in the pause state as shown in FIG. 8C. In response to that the user clicks on the pause option 810 shown in FIG. 8C, the first exemplary video will continue to be played, that is, the video example display area 701 of the exemplary page 700 presents the first exemplary video in the playing state as shown in FIG. 8B.

In some embodiments, on the exemplary page 700 shown in FIG. 7, the user can browse other video examples by sliding up and down. In some embodiments, the system can monitor the user's up/down sliding operations, the center of the display screen being used as a reference point, and automatically play the video example closest to the reference point. In some embodiments, for most video examples that are in the upper half of the display screen, the bottom edge of the video box is used to determine the distance between the video example and the reference point, and for most video examples that are in the lower half of the display screen, the top edge of the video box is used to determine the distance between the video example and the reference point.

In some embodiments, during the user's up/down sliding operations, the video example can remain paused, and the playback progress of the played video example can be recorded. When the user's sliding operation stops, the target video (that is, the video example currently closest to the reference point) is automatically played. If the target video has the recorded playback progress, it can continue to be played on the basis of the playback progress.

In some embodiments, only one video example is allowed to be played on the exemplary page at a time, and when the user's sliding operation is still not detected after the video example is played, the current video example is played repeatedly.

When the user is watching a certain second exemplary video and produces an intention to create a video based on the video template corresponding to the second exemplary video, the user can click on the second video production option associated with the second exemplary video. The terminal/application may present the second video template corresponding to the selected second video production option to the user, in response to the selection operation instruction for the second video production option. The template page presenting the second video template may be similar to the template page shown in FIG. 3, and the user can create a video based on the second video template. Here, the specific implementation details involved are the same as or similar to the previous description based on the first template. For details, the reference may be made to the related description above, which will not be repeated here.

In the video generating solution of the disclosure, through providing the video generating link on the video playback page, the user can conveniently enter the template page through the video generating link to create a video based on the video template used by the video played on the video playback page, when he/she is watching a video. In addition, the exemplary page can also be presented to the user to increase the chance of creating a video, thereby providing support for improving the conversion rate of video creation. Moreover, at least one video template is personally recommended to the user, giving the user more opportunities to choose templates, so that the user can still have other options when he may produce the intention of interrupting the video creation, to avoid interrupting the creation intention and thus provide support for improving the conversion rate of video creation.

Based on the same inventive concept, the method described above in the disclosure may be implemented by an apparatus. The effect of this apparatus is similar to the effect of the aforementioned method, and will not be repeated here.

Figure 9:
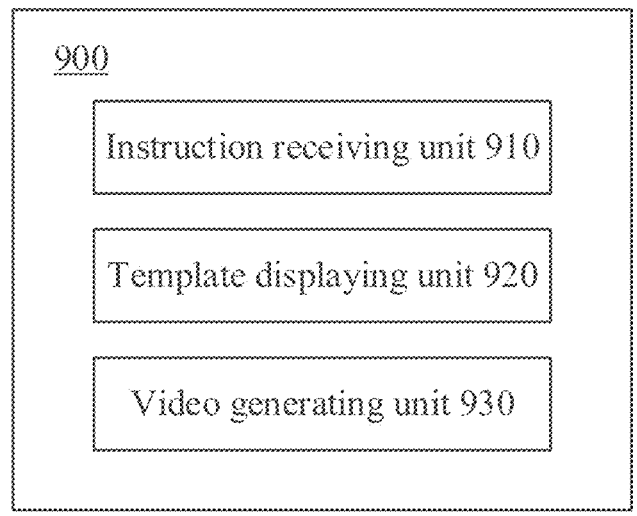
FIG. 9 is a structural schematic diagram of an apparatus for generating a video according to an embodiment of the disclosure.

FIG. 9 is a structural schematic diagram of an apparatus for generating video according to an embodiment of the disclosure.

As shown in FIG. 9, the apparatus 900 may include an instruction receiving unit 910, a template displaying unit 920, and a video generating unit 930.

In some embodiments, the instruction receiving unit 910 may be configured to receive a video generating instruction, where the video generating instruction is generated in response to a user operation on a video generating link on a video playback page. A template obtaining unit is configured to obtain video templates based on the video generating instruction, wherein the video templates comprises a first video template, wherein the first video template is a template adopted by a current video shown on the video playback page. The template displaying unit 920 may be configured to determine a target template based on the video template and to generate a video based on the target video template.

In some embodiments, the video templates further comprises a second template, wherein the second template includes one of: a template corresponding to a video with a click rate ranking in a top preset rank, a template similar to the first template and a template determined based on user preferences.

In some embodiments, the template obtaining unit is further configured to determine the target template based on the first template and the second template in response to a user's selecting instruction.

In some embodiments, the apparatus may further include a template list obtaining unit. The template list obtaining unit is configured to obtain a template list, where the template list comprises template identifiers of video templates, labels indicating whether video templates are offline, and terminal models and systems for video templates, and to determine whether the first template satisfies a preset condition based on the template list. The template displaying unit is configured to: in response to that the first template satisfies the preset condition, display the first video template, and in response to that the first template does not satisfy the preset condition, display abnormal information.

In some embodiments, the preset condition is: the template list comprises the template identifier of the first video template; the template list comprises a label that the first video template is not offline, and the template list comprises terminal models and systems which the first video template is adopted to.

In some embodiments, the video generating apparatus 900 may further include an exemplary page displaying unit. The exemplary page displaying unit may be configured to display an exemplary page of the first video template, where the exemplary page includes a first exemplary video and a first video production option, wherein the first exemplary video corresponds to the first video template, and the first video production option corresponds to the first exemplary video; and the template displaying unit is configured to display an edit page of the first video template in response to that the first video production option is selected.

In some embodiments, the exemplary page of the first template further includes a second exemplary video and a second video production option, where the second exemplary video corresponds to the second template, and the second video production option corresponds to the second exemplary video, and the template displaying unit 920 may display an edit page of the second video template in response to that the second video production option is selected.

The apparatus of the disclosure has been described in detail with reference to FIG. 9. The details of the function implementations of units or modules of the apparatus are the same as or similar to the previous description in combination with FIGS. 1-8C. The details may refer to the related description above, and will not be repeated here.

Figure 10:
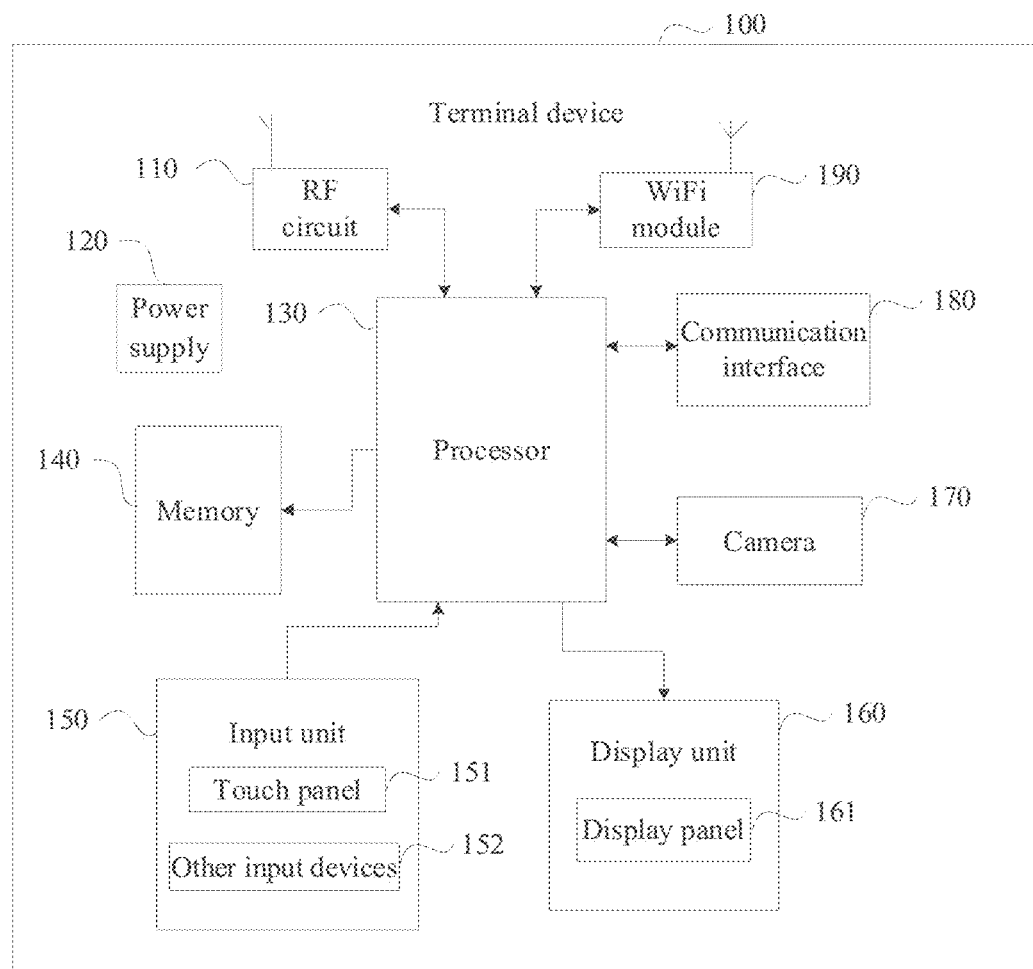
FIG. 10 is a structural schematic diagram of an electronic device according to an embodiment of the disclosure.

The embodiments of the disclosure provide a method and an electronic device for generating a video, and the method is applicable to the electronic device. FIG. 10 shows a structural diagram of an electronic device according to some embodiments. Referring to FIG. 10, the electronic device 100 includes: a Radio Frequency (RF) circuit 110, a power supply 120, a processor 130, a memory 140, an input unit 150, a display unit 160, a camera 170, a communication interface 180, a Wireless Fidelity (WiFi) module 190 and other components. Those skilled in the art may understand that the structure of the electronic device shown in FIG. 10 does not constitute a limitation on the electronic device, and the electronic device provided in the embodiments of the disclosure may include more or fewer components than those illustrated, or combine certain components, or use different component arrangements.

The components of the electronic device 100 will be introduced below in combination with FIG. 10.

The RF circuit 110 can be used to receive and send the data in the communication or call process. In particular, after receiving the downlink data of the base station, the RF circuit 110 sends it to the processor 130 for processing; and in addition, sends the uplink data to be sent to the base station. Generally, the RF circuit 110 includes but not limited to an antenna, at least one amplifier, a transceiver, a coupler, a Low Noise Amplifier (LNA), a duplexer, and the like.

Furthermore, the RF circuit 110 may further communicate with networks and other devices through wireless communication. The wireless communication may use any communication standard or protocol, including but not limited to: Global System of Mobile Communication (GSM), General Packet Radio Service (GPRS), Code Division Multiple Access (CDMA), Wideband Code Division Multiple Access (WCDMA), Long Term Evolution (LTE), e-mail, Short Messaging Service (SMS), etc.

The WiFi technology belongs to the short-distance wireless transmission technology, and the electronic device 100 may be connected to an Access Point (AP) via the WiFi module 190, so as to achieve the access to the data network. The WiFi module 190 can be used to receive and send the data in the communication process.

The electronic device 100 may be physically connected with other devices through the communication interface 180. In some embodiments, the communication interface 180 is connected to the communication interface of the other device through a cable to implement the data transmission between the electronic device 100 and the other device.

In some embodiments, the electronic device 100 can implement the communication services and send the information to other contacts, so the electronic device 100 needs to have the data transmission function, that is, the electronic device 100 needs to include a communication module inside. Although FIG. 10 shows the RF circuit 110, the WiFi module 190, the communication interface 180 and other communication modules, it can be understood that there is at least one of the above-mentioned components or other communication modules (such as Bluetooth module) used to implement communications in the electronic device 100 to perform the data transmission.

For example, when the electronic device 100 is a mobile phone, the electronic device 100 may include the RF circuit 110, and may further include the WiFi module 190; when the electronic device 100 is a computer, the electronic device 100 may include the communication interface 180, and may further include the WiFi module 190; when the electronic device 100 is a tablet computer, the electronic device 100 may include the WiFi module.

The memory 140 can be used to store software programs and modules. The processor 130 executes various functional applications and data processing (e.g., all or some of the operations of the method for generating a video described above in the disclosure) of the electronic device 100 by running the software programs and modules stored in the memory 140.

In some embodiments, the memory 140 may mainly include a program storage area and a data storage area, where the program storage area can store operating systems, various application programs (such as communication applications) and face recognition module, etc, and the data storage area can store the data (such as various pictures, video files and other multimedia files, as well as face information templates) created based on the use of the electronic device, etc.

Furthermore, the memory 140 may include a high speed random access memory, and may further include a non-volatile memory, e.g., at least one magnetic disk storage device, flash memory device, or other volatile solid-state storage device.

The input unit 150 may be configured to receive the number or character information input by a user, and generate the key signal input related to the user settings and functional controls of the electronic device 100.

In some embodiments, the input unit 150 may include a touch panel 151 and other input devices 152.

Here, the touch panel 151, also called touch screen, may collect the touch operations of the user on or near it (for example, the operations of the user using any suitable object or accessory such as finger or touch pen on or near the touch panel 151), and drive the corresponding connection apparatus according to the preset program. In some embodiments, the touch panel 151 may include two parts: a touch detection device and a touch controller, wherein the touch detection device detects the touch orientation of the user, detects the signal generated from the touch operation, and transmits the signal to the touch controller; and the touch controller receives the touch information from the touch detection device, converts it into the contact coordinates and then sends them to the processor 130, and can receive and execute the commands sent by the processor 130. Furthermore, the touch panel 151 may be implemented in various types, such as resistance type, capacitive type, infrared, surface acoustic wave and others.

In some embodiments, other input devices 152 may include but not limited to one or more of physical keyboard, function key (such as volume control key, switch key, etc), trackball, mouse, joystick and the like.

The display unit 160 may be configured to display the information input by the user or the information provided to the user and various menus of the electronic device 100. The display unit 160 is the display system of the electronic device 100, and is configured to present the interface to realize the human-computer interaction.

The display unit 160 may include a display panel 161. In some embodiments, the display panel 161 may be configured in form of Liquid Crystal Display (LCD), Organic Light-Emitting Diode (OLED) or the like.

Further, the touch panel 151 may cover the display panel 161. When the touch panel 151 detects a touch operation on or near it, it transmits the touch operation to the processor 130 to determine the type of touch event, and then the processor 130 provides the corresponding visual output on the display panel 161 according to the type of the touch event.

In FIG. 10, the touch panel 151 and the display panel 161 as two independent components realize the input and output functions of the electronic device 100, but in some embodiments, the touch panel 151 and the display panel 161 may be integrated to realize the input and output functions of the electronic device 100.

The processor 130 is the control center of the electronic device 100, uses various interfaces and lines to connect various components, and executes various functions and data processing of the electronic device 100 by running or executing the software programs and/or modules stored in memory 140 and invoking the data stored in memory 140. For example, the processor runs the software programs or modules to implement all or some of the operations of the method for generating a video as described above, so as to realize a plurality of services based on the electronic device.

In some embodiments, the processor 130 may include one or more processing units. In some embodiments, the processor 130 may integrate an application processor and a modem processor, wherein the application processor mainly processes the operating system, user interface and application programs, etc., and the modem processor mainly processes the wireless communications. It can be understood that the above modem processor may not be integrated into the processor 130.

The camera 170 is configured to implement the shooting function of the electronic device 100, and shoot pictures or videos. The camera 170 may further be configured to realize the scanning function of the electronic device 100, and scan the scanned object (two-dimensional code/bar code).

The electronic device 100 further includes a power supply 120 (such as battery) configured to power various components. In some embodiments, the power supply 120 may be logically connected to the processor 130 through the power management system, so as to realize functions such as charging, discharging, and power management through the power management system.

Although not shown, the electronic device 100 may further include at least one sensor, an audio circuit, etc., which will not be repeated here.

It should be understood by those skilled in the art that the embodiments of the disclosure can be provided as methods, systems and computer program products. Thus the disclosure can take the form of hardware embodiments alone, software embodiments alone, or embodiments combining the software and hardware aspects. Also the disclosure can take the form of computer program products implemented on one or more computer usable storage mediums (including but not limited to magnetic disk memories, CD-ROMs, optical memories and the like) containing computer usable program codes therein.

The disclosure is described by reference to the flow charts and/or the block diagrams of the methods, the devices (systems) and the computer program products according to the disclosure. It should be understood that each process and/or block in the flow charts and/or the block diagrams, and a combination of processes and/or blocks in the flow charts and/or the block diagrams can be implemented by the computer program instructions. These computer program instructions can be provided to a general-purpose computer, a dedicated computer, an embedded processor, or a processor of another programmable data processing device to produce a machine, so that an apparatus for implementing the functions specified in one or more processes of the flow charts and/or one or more blocks of the block diagrams is produced by the instructions executed by the computer or the processor of another programmable data processing device.

These computer program instructions can also be stored in a computer readable memory which is capable of guiding the computer or another programmable data processing device to operate in a particular way, so that the instructions stored in the computer readable memory produce a manufacture including the instruction apparatus which implements the functions specified in one or more processes of the flow charts and/or one or more blocks of the block diagrams.

These computer program instructions can also be loaded onto the computer or another programmable data processing device, so that a series of operations are performed on the computer or another programmable device to produce the computer-implemented processing. Thus the instructions executed on the computer or another programmable device provide operations for implementing the functions specified in one or more processes of the flow charts and/or one or more blocks of the block diagrams.

Evidently those skilled in the art can make various modifications and variations to the disclosure without departing from the spirit and scope of the disclosure. Thus the disclosure is also intended to encompass these modifications and variations to the disclosure as long as these modifications and variations come into the scope of the claims of the disclosure and their equivalents.

What is claimed is:

1. A method for generating a video, comprising:
   receiving a video generating instruction, wherein the video generating instruction is generated in response to a user operation on a video generating link on a video playback page;
   obtaining a template list of video templates based on the video generating instruction, wherein the template list comprises template identifiers of video templates, labels indicating whether the video templates are offline, and terminal models and systems which the video templates are adopted to, and wherein the video templates comprises a first video template, and the first video template is a template adopted by a current video shown on the video playback page;
   determining whether the first video template satisfies a preset condition based on the template list;
   in response to the first video template satisfies satisfying the preset condition:
   displaying a template page of the first video template, wherein the template page displays a plurality of key frames corresponding to the first video template;
   previewing content of the first video template by clicking on or sliding the plurality of key frames;
   determining a target template based on the first video template; and
   generating the video based on the target template; and
   in response to the first video template not satisfy satisfying the preset condition, displaying abnormal information.

2. The method according to claim 1, wherein the video templates further comprises a second template, wherein the second template comprises one of:
   a template corresponding to a video with a click rate ranking in a top preset rank;
   a template similar to the first template;
   a template determined based on user preferences.

3. The method according to claim 2, wherein the method further comprises:
   determining the target template based on the first template and the second template in response to a user's selecting instruction;
   replacing the first template presented on a template page with the second template, when determined that the second template is the target template; and
   generating the video based on the second template.

4. The method according to claim 1, wherein the preset condition comprises:
   the template list comprises the template identifier of the first video template;
   the template list comprises a label that the first video template is not offline;
   the template list comprises terminal models and systems which the first video template is adopted to.

5. The method according to claim 1, wherein said obtaining the video templates further comprises:
   displaying an exemplary page of the first video template, wherein the exemplary page comprises a first exemplary video and a first video production option, wherein the first exemplary video corresponds to the first video template, and the first video production option corresponds to the first exemplary video;
   displaying an edit page of the first video template in response to the first video production option being selected.

6. The method according to claim 5, wherein said obtaining the video templates further comprises:
   displaying a second video template in the exemplary page, wherein the exemplary page comprises a second exemplary video and a second video production option, wherein the second exemplary video corresponds to the second template, and the second video production option corresponds to the second exemplary video;
   displaying an edit page of the second video template in response to the second video production option being selected.

7. An electronic device, comprising:
   a processor;
   a memory configured to store instructions executable by the processor;
   wherein the processor is configured to execute the instructions to perform:
   receiving a video generating instruction, wherein the video generating instruction is generated in response to a user operation on a video generating link on a video playback page;
   obtaining a template list of video templates based on the video generating instruction, wherein the template list comprises template identifiers of video templates, labels indicating whether the video templates are offline, and terminal models and systems which the video templates are adopted to, and wherein the video templates comprises a first video template, and the first video template is a template adopted by a current video shown on the video playback page;
   determining whether the first video template satisfies a preset condition based on the template list;
   in response to the first video template satisfies satisfying the preset condition:
   displaying a template page of the first video template, wherein the template page displays a plurality of key frames corresponding to the first video template;

previewing content of the first video template by clicking on or sliding the plurality of key frames;
determining a target template based on the first video template; and
generating the video based on the target template; and
in response to the first video template not satisfy satisfying the preset condition, displaying abnormal information.

8. The electronic device according to claim 7, wherein the video templates further comprises a second template, wherein the second template comprises one of:
a template corresponding to a video with a click rate ranking in a top preset rank;
a template similar to the first template;
a template determined based on user preferences.

9. The electronic device according to claim 8, wherein the processor is further configured to execute the instructions to perform:
determining the target template based on the first template and the second template in response to a user's selecting instruction;
replacing the first template presented on a template page with the second template, when determined that the second template is the target template; and
generating the video based on the second template.

10. The electronic device according to claim 7, wherein the preset condition comprises:
the template list comprises the template identifier of the first video template;
the template list comprises a label that the first video template is not offline;
the template list comprises terminal models and systems which the first video template is adopted to.

11. The electronic device according to claim 7, wherein said obtaining the video templates further comprises:
displaying an exemplary page of the first video template, wherein the exemplary page comprises a first exemplary video and a first video production option, wherein the first exemplary video corresponds to the first video template, and the first video production option corresponds to the first exemplary video;
displaying an edit page of the first video template in response to the first video production option being selected.

12. The electronic device according to claim 11, wherein said obtaining the video templates further comprises:
displaying a second video template in the exemplary page, wherein the exemplary page comprises a second exemplary video and a second video production option, wherein the second exemplary video corresponds to the second template, and the second video production option corresponds to the second exemplary video;
displaying an edit page of the second video template in response to the second video production option being selected.

13. A non-transitory computer storage medium storing computer executable instructions, wherein the computer executable instructions are configured to be executed to perform:
receiving a video generating instruction, wherein the video generating instruction is generated in response to a user operation on a video generating link on a video playback page;
obtaining a template list of video templates based on the video generating instruction, wherein the template list comprises template identifiers of video templates, labels indicating whether the video templates are offline, and terminal models and systems which the video templates are adopted to, and wherein the video templates comprises a first video template, and the first video template is a template adopted by a current video shown on the video playback page;
determining whether the first video template satisfies a preset condition based on the template list;
in response to the first video template satisfies satisfying the preset condition:
displaying a template page of the first video template, wherein the template page displays a plurality of key frames corresponding to the first video template;
previewing content of the first video template by clicking on or sliding the plurality of key frames;
determining a target template based on the first video template; and
generating the video based on the target template; and
in response to the first video template not satisfy satisfying the preset condition, displaying abnormal information.

14. The non-transitory computer storage medium according to claim 13, wherein the video templates further comprises a second template, wherein the second template comprises one of:
a template corresponding to a video with a click rate ranking in a top preset rank;
a template similar to the first template;
a template determined based on user preferences.

15. The non-transitory computer storage medium according to claim 14, wherein the computer executable instructions are further configured to be executed to perform:
determining the target template based on the first template and the second template in response to a user's selecting instruction;
replacing the first template presented on a template page with the second template, when determined that the second template is the target template; and
generating the video based on the second template.

16. The non-transitory computer storage medium according to claim 13, wherein the preset condition comprises:
the template list comprises the template identifier of the first video template;
the template list comprises a label that the first video template is not offline;
the template list comprises terminal models and systems which the first video template is adopted to.

17. The non-transitory computer storage medium according to claim 13, wherein said obtaining the video templates further comprises:
displaying an exemplary page of the first video template, wherein the exemplary page comprises a first exemplary video and a first video production option, wherein the first exemplary video corresponds to the first video template, and the first video production option corresponds to the first exemplary video;
displaying an edit page of the first video template in response to the first video production option being selected.

* * * * *